No. 608,071. Patented July 26, 1898.
H. J. OTTO & A. E. WIELSCH.
RAILROAD ATTACHMENT FOR BICYCLES.
(Application filed Feb. 8, 1898.)

(No Model.) 2 Sheets—Sheet 1.

WITNESSES:
Jos. A. Ryan
P. B. Terpin.

INVENTORS
Henry J. Otto.
Arthur E. Wielsch
BY Munn & Co.
ATTORNEYS.

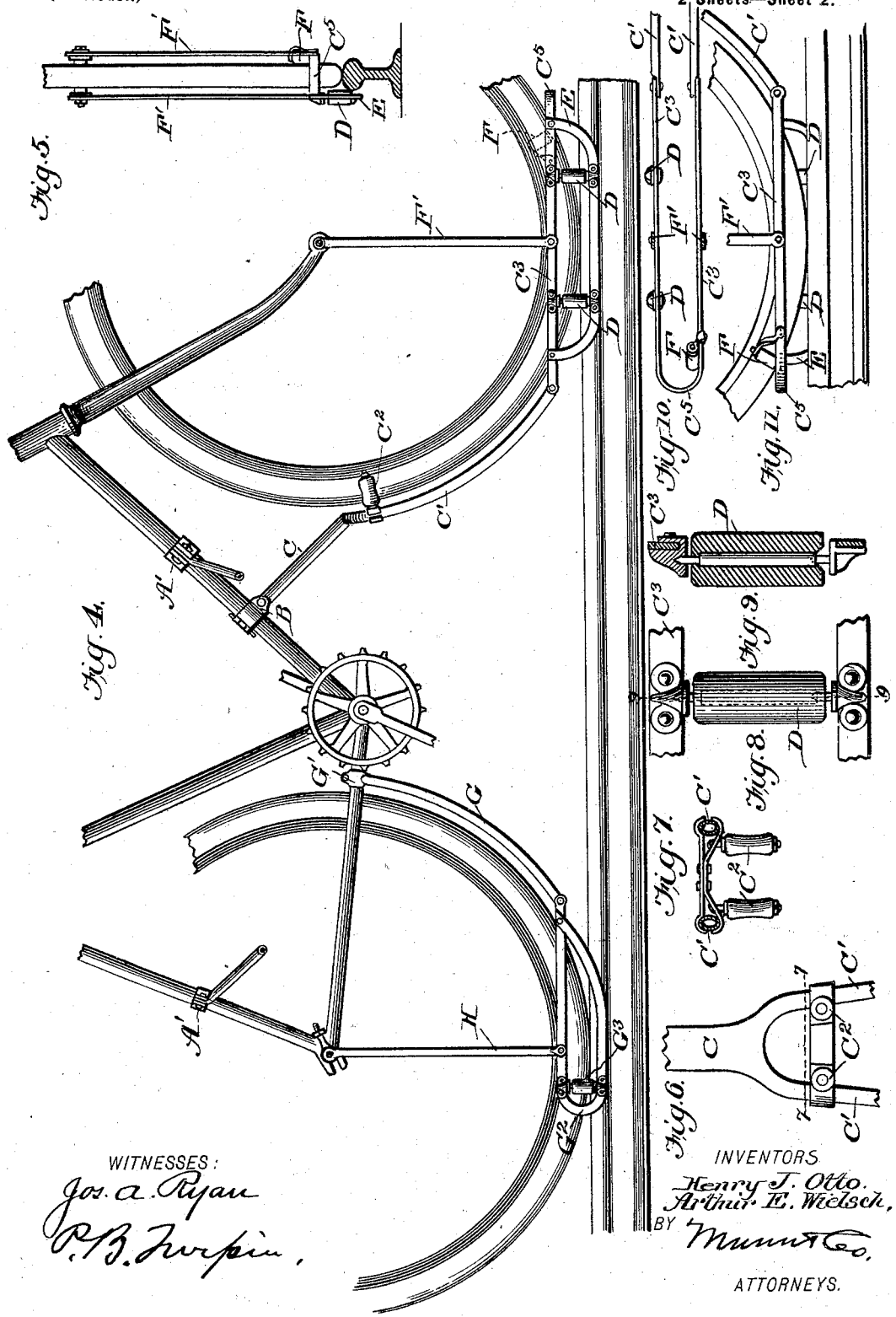

UNITED STATES PATENT OFFICE.

HENRY JOHN OTTO AND ARTHUR E. WIELSCH, OF BUTTE, MONTANA; SAID OTTO ASSIGNOR OF ONE-SIXTH TO SAID WIELSCH.

RAILROAD ATTACHMENT FOR BICYCLES.

SPECIFICATION forming part of Letters Patent No. 608,071, dated July 26, 1898.

Application filed February 8, 1898. Serial No. 669,527. (No model.)

*To all whom it may concern:*

Be it known that we, HENRY JOHN OTTO and ARTHUR E. WIELSCH, of Butte, in the county of Silver Bow and State of Montana, have invented a new and useful Improvement in Railroad Attachments for Bicycles, of which the following is a specification.

Our invention is an improvement in railroad attachments for bicycles or attachments by which bicycles are fitted for use on railroads; and the invention consists in certain novel constructions and combinations of parts, as will be hereinafter described, and pointed out in the claims.

Figure 1:
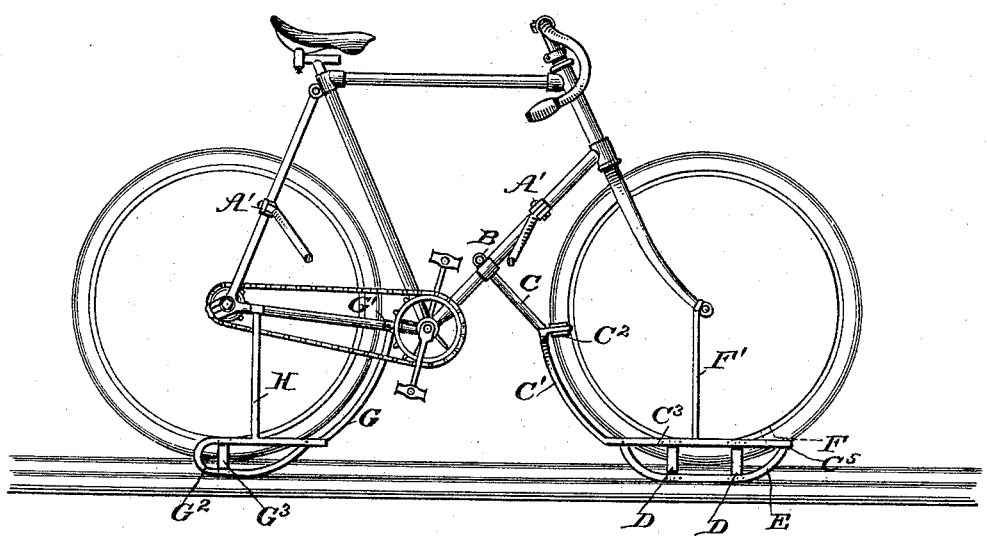
Figure 2:
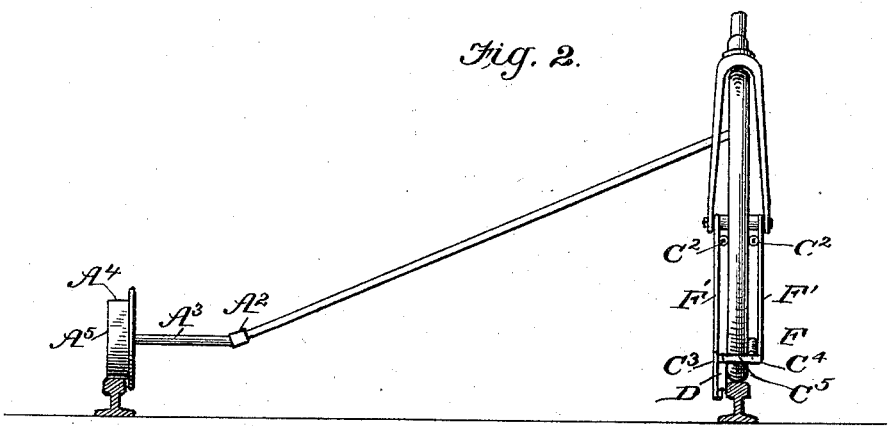
Figure 3:
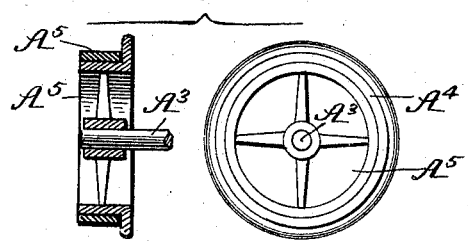

In the drawings, Figure 1 is a side view, and Fig. 2 is a front view, of the improvement as in use. Fig. 3 is a detail view of the flanged wheel which runs upon the rail opposite that which forms a track for the bicycle. Fig. 4 is a detail view, partly broken away, illustrating some of the devices in detail. Fig. 5 is a detail front view of the wheel, partly broken away. Figs. 6 and 7 are detail views illustrating the guide-wheels for the rear of the front wheel and the forked supporting-frame therefor. Figs. 8 and 9 are detail views illustrating the guide-rollers which run alongside the rail, and Figs. 10 and 11 are detail views illustrating the lower forwardly-extending portion of the frame-bar with its attached rollers.

Our invention seeks to provide a simple construction by which the ordinary bicycle can be used upon a railroad-track, the bicycle running upon one rail and devices being connected with it by which it is held in position to run on the rail.

In the construction shown we connect with the bicycle a lateral frame, whose arms A are connected with the bicycle at A' and are united or merged at $A^2$ into a single shaft $A^3$, on which is journaled the flanged wheel $A^4$, which acts in opposition to the flange devices on the bicycle and operates to steady the bicycle in place on the opposite rail to that on which the wheel $A^4$ runs.

The wheel $A^4$ is preferably made of papier-mâché and provided with a rubber tire $A^5$, as best shown in Fig. 3.

To the front lower brace of the bicycle we secure at B a frame-bar C, which extends down and forward to a point in rear of and close to the front wheel at a point about midway between the upper and lower ends of the main wheel. At this point the frame is forked at C', is provided with rollers $C^2 C^2$, running on opposite sides of the front wheel of the bicycle, and is extended down and forward, with its branches $C^3 C^4$ extended forward on opposite sides of the lower or tread portion of the front wheel, such branches $C^3 C^4$ being united by a cross-bar $C^5$ in advance of the front wheel. The branch $C^3$ on the inner side of the wheel supports the rollers D D, which extend down below the top of the rail and bear against the inner side of the same, forming a flange in opposition to the wheel $A^4$. These rollers D D are preferably arranged as shown, one in advance and the other in rear of the point of tread of the front wheel, and are braced in position by a bow E, depending from the inner brace $C^3$.

To the outer wing $C^4$ is journaled a roller F at such an angle that it will run with the wheel, such roller F being used in guiding. The function of the roller F is to act in opposition to the rollers $C^2$ to steady the wheel and prevent lateral motion. The roller F is not in continuous motion, but only rolls from time to time when the tire comes in contact with same. The branches $C^3$ and $C^4$ are braced by rods F', dropped from the handle-forks.

A frame-bar G is connected at G' with the rear lower brace and curves down in front of the lower wheel and extends along the inner side of said rear wheel, being bent into the form of a loop $G^2$, in which is journaled a roller $G^3$, which bears against the inner side of the rail alongside the rear wheel. A rod H, connected with the bicycle near the bearing of the rear wheel, braces the loop $G^2$ in position.

The rollers D D are so constructed that they will not catch or scrape, but will roll in proportion to the speed of the bicycle, and the rollers $C^2$ roll the moment the wheel-tire touches them, such rolls $C^2$ being so placed as to maintain the wheel in line with the rail upon which it is running and relieve a considerable portion of the strain from the rollers D.

The improved attachment can be made very light and taken off and applied with ease and can be fitted in a case provided for the purpose and carried by a cyclist, so the bicycle can be used, as usual, on a roadway and the railroad attachment be applied when it is desired to travel on a railroad-track.

Having thus described our invention, what we claim as new, and desire to secure by Letters Patent, is—

1. In a bicycle an attachment comprising a forked frame extended alongside the opposite sides of the lower portion of the front wheel and provided in front and rear of the wheel-tread with rollers to bear alongside the railroad-rail such rollers having approximately vertical axes substantially as described.

2. An attachment for bicycles comprising a front frame having branches extended along the lower and up along the rear side of the front wheel and having said branches provided with rollers to bear alongside the railroad-rail and with rollers which bear on opposite sides of the front wheel at the rear of the latter substantially as described.

3. In a bicycle an attachment for use on railroad-rails comprising a forked frame embracing the front wheel and having rollers bearing on opposite sides of the wheel and also rollers to bear alongside the rail the axes of said rollers being approximately at right angles to that of the wheel substantially as described.

4. In a bicycle an attachment having a frame adjacent to the front wheel and provided with a front roller arranged to turn with the said wheel and to bear against the same in guiding and with guide-rollers operating on opposite sides of the rear of said wheel substantially as described.

5. In a bicycle the combination with the front wheel of a frame having branches extended on opposite sides of said wheel and provided on the inner branch with vertically-journaled rollers which engage the inner side of the railroad-rail and on the outer branch with a roller for engagement by the wheel in guiding substantially as described.

6. A bicycle provided with a lateral frame and a flanged wheel thereon, and the frames extended along the inner side of the bicycle-wheels and provided with rollers which have vertical axes, and are adapted to bear against the inner side of the railroad-rail and act in opposition to the flanged wheel whereby to secure the bicycle on the railroad-rail opposite that occupied by the flanged wheel substantially as described.

7. In a bicycle, a guide and brace for the front wheel comprising a frame having portions extended up along the rear side and forward along the lower edge of said wheel, guide-rollers on the upper portion of the frame and bearing along the opposite sides of the wheel and rollers on the forwardly-extended portion of the frame, said rollers having approximately vertical axes and being arranged to operate alongside the rail, substantially as set forth.

HENRY JOHN OTTO.
ARTHUR E. WIELSCH.

Witnesses:
C. M. PARR,
E. J. GREER.